United States Patent
Sodagar

(10) Patent No.: US 11,356,534 B2
(45) Date of Patent: Jun. 7, 2022

(54) FUNCTION REPOSITORY SELECTION MODE AND SIGNALING FOR CLOUD BASED PROCESSING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 16/839,676

(22) Filed: Apr. 3, 2020

(65) Prior Publication Data

US 2020/0344323 A1     Oct. 29, 2020

Related U.S. Application Data

(60) Provisional application No. 62/837,605, filed on Apr. 23, 2019.

(51) Int. Cl.
*H04L 67/63* (2022.01)
*H04N 21/647* (2011.01)
*H04L 67/133* (2022.01)
*H04L 67/00* (2022.01)

(52) U.S. Cl.
CPC ............ *H04L 67/327* (2013.01); *H04L 67/34* (2013.01); *H04L 67/40* (2013.01); *H04N 21/64784* (2013.01)

(58) Field of Classification Search
CPC ....... H04L 67/327; H04L 67/34; H04L 67/40; H04N 21/64784
See application file for complete search history.

(56) References Cited

U.S. PATENT DOCUMENTS

| | | | |
|---|---|---|---|
| 2005/0005025 A1* | 1/2005 | Harville | H04L 65/4084 709/241 |
| 2019/0028691 A1* | 1/2019 | Hinds | H04N 21/4518 |
| 2019/0037252 A1* | 1/2019 | Wagenaar | H04L 65/602 |
| 2019/0394498 A1* | 12/2019 | Lo | H04N 21/6405 |
| 2020/0020077 A1* | 1/2020 | You | H04N 5/2624 |

(Continued)

FOREIGN PATENT DOCUMENTS

| | | | | |
|---|---|---|---|---|
| WO | WO-2020049489 A1 | * | 3/2020 | ............. G06F 9/542 |
| WO | WO-2020144396 A1 | * | 7/2020 | ......... H04N 21/6334 |
| WO | WO-2020188140 A1 | * | 9/2020 | ........... H04N 21/237 |

OTHER PUBLICATIONS

Systems, "Potential enhancements for Network-based Media Processing", International Organisation for Standardisation, ISO/IEC JTC 1/SC 29/WG 11, Coding of moving pictures and audio Convenorship: UNI (Italy), Mar. 2019, N18401 pp. 1-106 (total 116 pages).

*Primary Examiner* — Blake J Rubin
(74) *Attorney, Agent, or Firm* — Sughrue Mion, PLLC

(57) ABSTRACT

A method and system for processing media content in Moving Picture Experts Group (MPEG) Network Based Media Processing (NBMP) includes obtaining a list of function repositories, each function repository storing one or more functions for processing the media content, obtaining a descriptor identifying a location of each of the function repositories identified in the list of function repositories, selecting a function repository, from among the function repositories, according to a criterion, and processing the media content using a function included in the selected function repository.

20 Claims, 5 Drawing Sheets

(56) References Cited

U.S. PATENT DOCUMENTS

| | | | |
|---|---|---|---|
| 2020/0092530 A1* | 3/2020 | Wang | H04N 13/349 |
| 2020/0177694 A1* | 6/2020 | Kolan | H04L 67/34 |
| 2020/0219536 A1* | 7/2020 | Wang | G11B 27/329 |
| 2020/0302575 A1* | 9/2020 | Lee | G06F 9/48 |
| 2020/0304508 A1* | 9/2020 | Bae | H04L 63/102 |
| 2021/0258632 A1* | 8/2021 | Hoffmann | H04N 21/2343 |
| 2021/0279945 A1* | 9/2021 | Bae | H04N 21/816 |

* cited by examiner

US 11,356,534 B2

FUNCTION REPOSITORY SELECTION MODE AND SIGNALING FOR CLOUD BASED PROCESSING

CROSS-REFERENCE TO RELATED APPLICATION

This application claims priority from U.S. Provisional Patent Application No. 62/837,605, filed on Apr. 23, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not define the repository used to find the functions for processing the media. Thus, with the current NBMP design, it may be necessary to use a workflow manager to find a repository, leading to reduced efficiency.

SUMMARY

According to embodiments, a method of processing media content in Moving Picture Experts Group (MPEG) Network Based Media Processing (NBMP) is performed by at least one processor, and includes obtaining a list of function repositories, each function repository storing one or more functions for processing the media content, obtaining a descriptor identifying a location of each of the function repositories identified in the list of function repositories, selecting a function repository, from among the function repositories, according to a criterion, and processing the media content using a function included in the selected function repository.

According to embodiments, an apparatus for processing media content in Moving Picture Experts Group (MPEG) Network Based Media Processing (NBMP) includes at least one memory configured to store program code, and at least one processor configured to read the program code and operate as instructed by the program code, the program code including first obtaining code configured to cause the at least one processor to obtain a list of function repositories, each function repository storing one or more functions for processing the media content, second obtaining code configured to cause the at least one processor to obtain a descriptor identifying a location of each of the function repositories identified in the list of function repositories, selecting code configured to cause the at least one processor to select a function repository, from among the function repositories, according to a criterion; and processing code configured to cause the at least one processor to process the media content using a function included in the selected function repository.

According to embodiments, a non-transitory computer-readable medium stores instructions that, when executed by at least one processor of an apparatus for processing media content in Moving Picture Experts Group (MPEG) Network Based Media Processing (NBMP), cause the at least one processor to obtain a list of function repositories, each function repository storing one or more functions for processing the media content, obtain a descriptor identifying a location of each of the function repositories identified in the list of function repositories, select a function repository, from among the function repositories, according to a crite-rion, and process the media content using a function included in the selected function repository.

DETAILED DESCRIPTION

Embodiments described herein provide a method for signalling a preferred function repository or repositories used in deployment of a workflow on cloud in NBMP standard. Embodiments provide functional improvements to the MPEG NBMP standard. Such improvements increase media processing efficiency, increase speed and lower cost of deployment of media services, and allow large scale deployment of media services by leveraging public, private or hybrid cloud services.

In examples, the functional improvements to the MPEG NBMP standard include enabling to define one or more repositories to be used for workflow deployment. In this case, instead of relying on Workflow Manager to find a repository, NBMP Source provides a list of repositories to be used. Also, the improvements include enabling to define various modes for using multiple repositories. The mode defines the exclusivity, preference, recommendation and also the order of repositories to be used.

Figure 1:
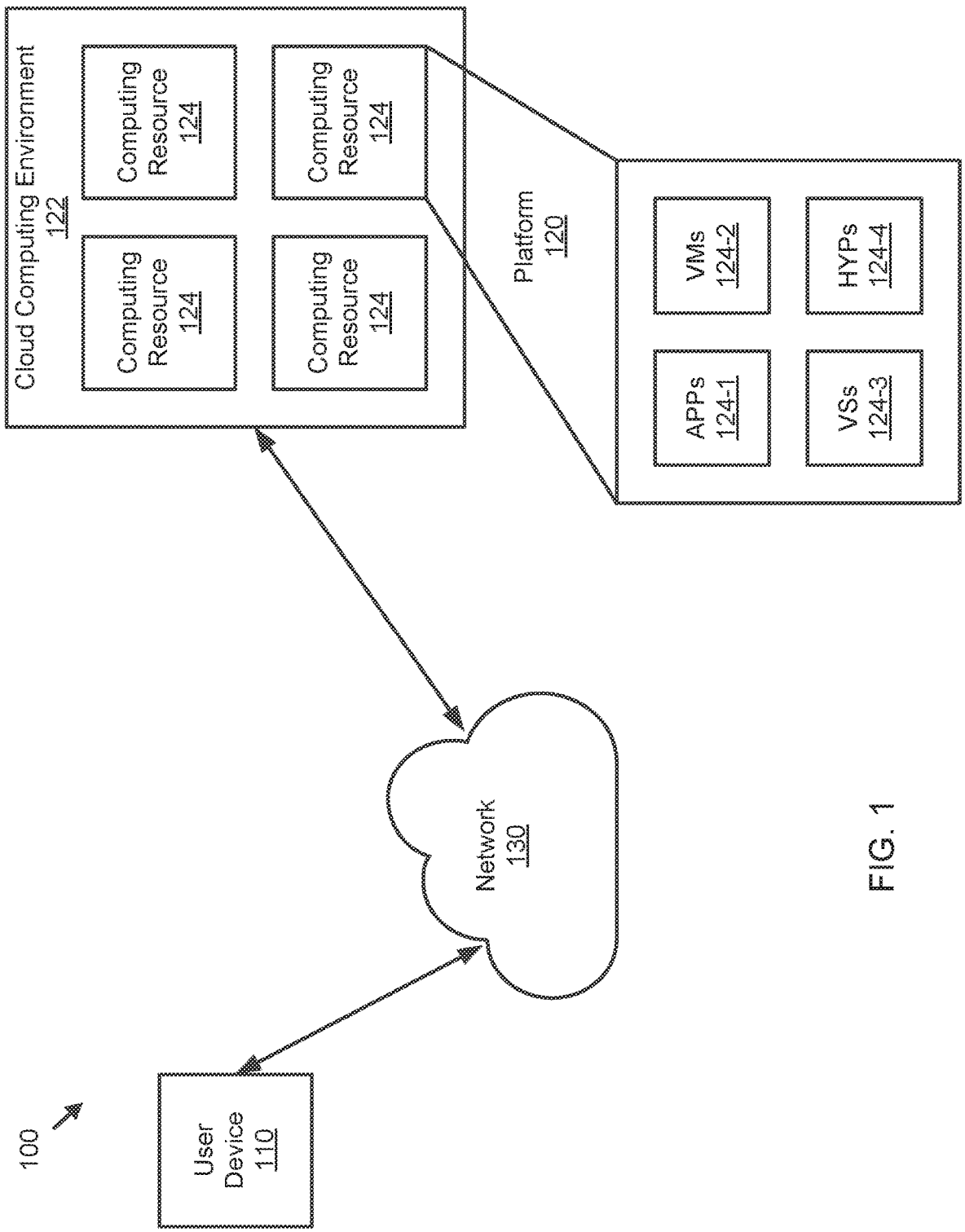
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
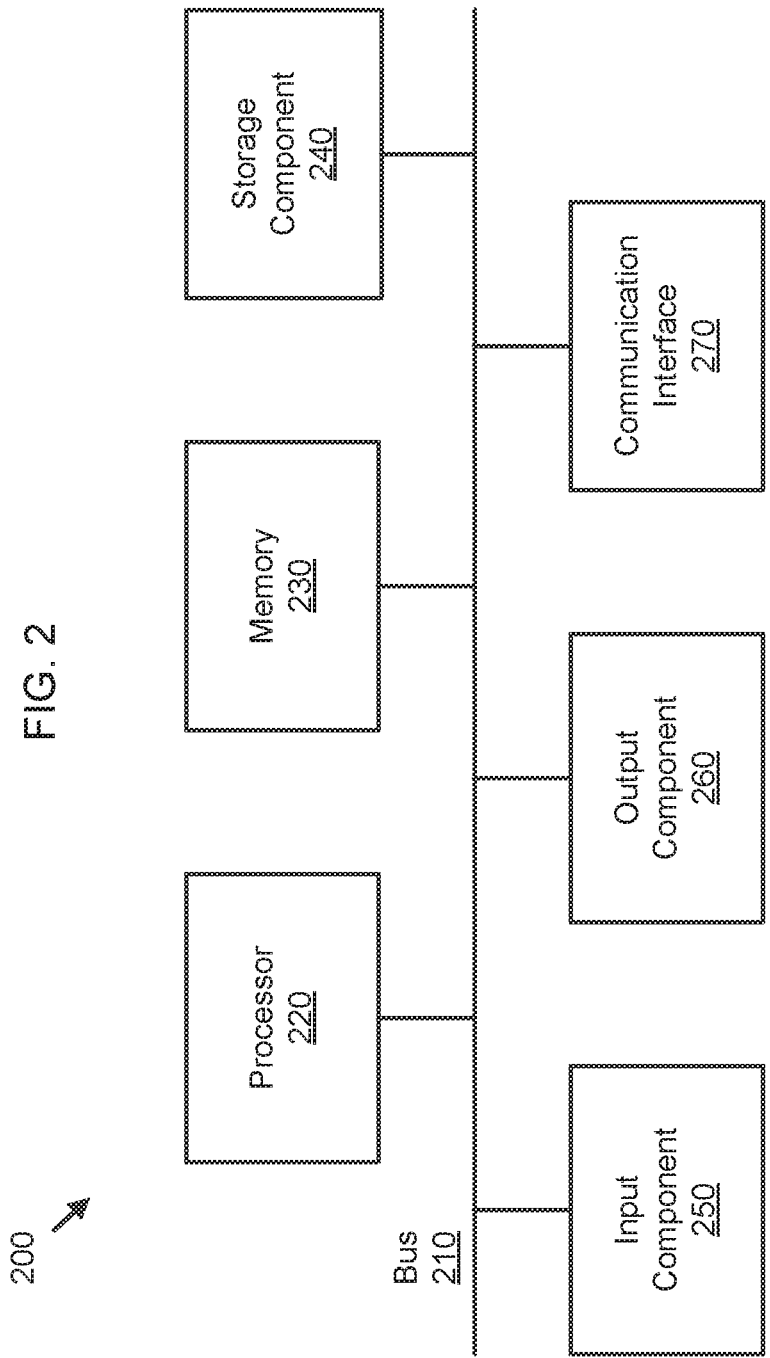
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200.

For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
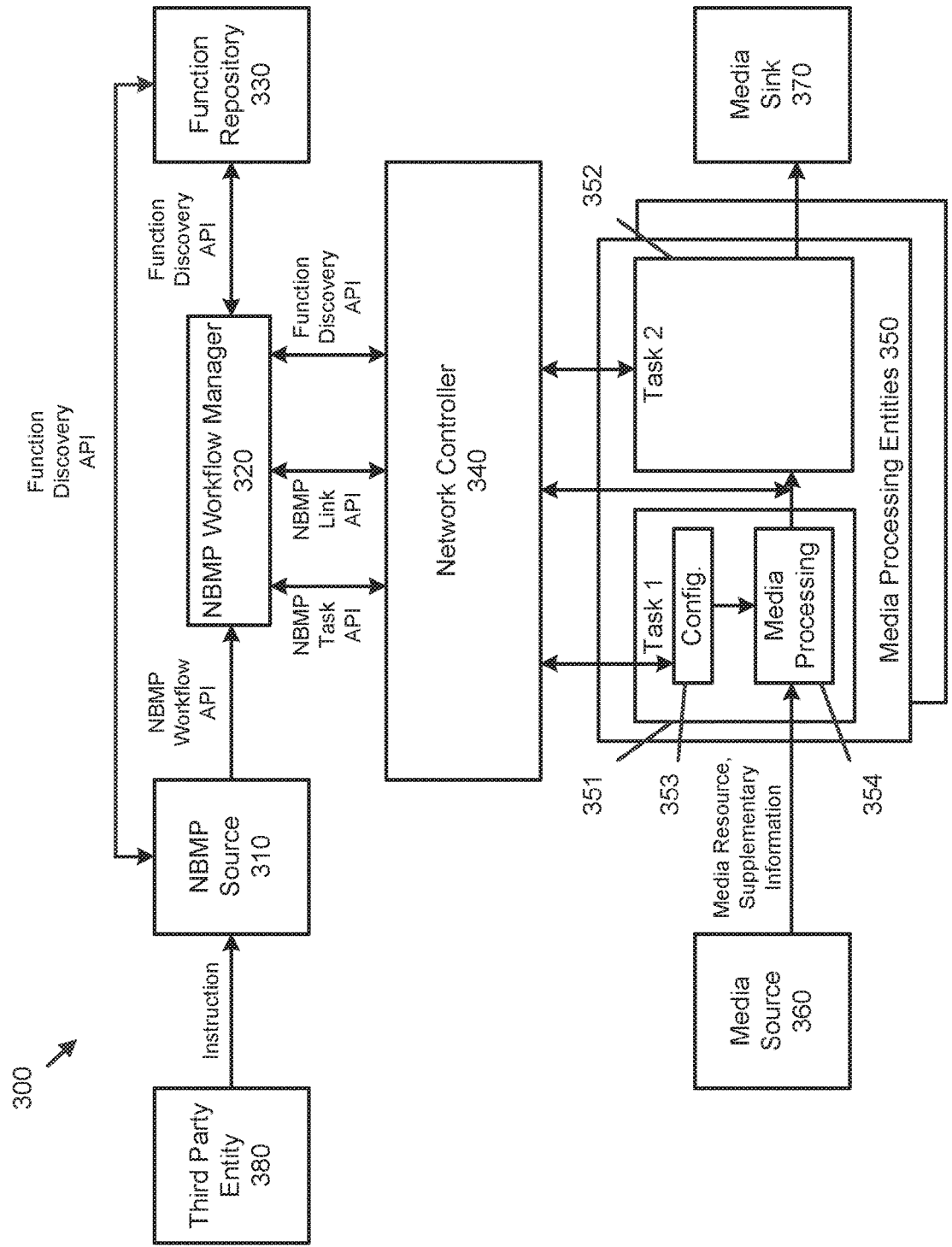
FIG. 3 is a block diagram of an NBMP system, according to embodiments.

FIG. 3 is a block diagram of an NBMP system 300, according to embodiments.

Referring to FIG. 3, the NBMP system 300 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350. When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include descriptors, each of which including parameters. In embodiments, communication between any of components of the NBMP system 300 using an API may include descriptors, each of which including parameters.

Use Cases for Identifying and Signaling Various Function Repositories

The following use-case should be considered in the deployment of NBMP:
1. Workflow Manager has a default Function Repository.
2. Workflow Manager uses Function Repositories provided by the Cloud Platform that the Workflow will be deployed on.
3. NBMP Source has an exclusive Function Repository. This repository is preferred because of the deployment cost or other business benefits to NBMP Source.
4. NBMP provides a list of Function repositories. Multiple repositories can provide more extensive Function directories. In this case, the function repositories might have an order of preference To address the above use case, embodiments define a descriptor to signal the Function repositories by their location (e.g., uniform resource locator (URL)) in Workflow Description.

Repository Descriptor

According to embodiments, a new descriptor is added to signal the list of Function repositories and their location to Workflow manager:

TABLE 1

Repository Descriptor

| Parameter Name | Description | Data Type | Cardinality |
| --- | --- | --- | --- |
| Mode | Provides the mode for repository preference. The following values are allowed: "strict": only the listed repositories in this descriptor shall be used for deployment of the workflow. "preferred": the listed repositories in this descriptor shall be used first for deployment of the workflow. If a Function is not found in these repositories, a different repository may be used. "available": the listed repositories in this descriptor may be used first for deployment of the workflow. Other repositories may also be used. | String | 1 |
| Ordered | If this flag is set, the repository list is listed according to the preference order of use from high to low, i.e. the first repository is the most preferred one. | Boolean | 0-1 |
| Repository | Provide Repository information | Object | 1-N |

TABLE 2

Repository Object

| URL | Provides the location of repository. It shall be a valid URL according to IETF RFC 3986. | String | 1 |
| --- | --- | --- | --- |
| Description | Provides a human readable description for repository | String | 1 |

JSON Schema

```
{
  "title": "The Repository Descriptor Schema",
  "type": "object",
  "title": "repository Descriptor Schema",
  "required": [
    "mode",
    "repository"
  ],
  "properties": {
    "mode": {
      "type": "string"
    },
    "ordered": {
      "type": "boolean"
    },
    "repository": {
      "type": "object",
      "required": [
        "url",
        "description"
      ],
      "properties": {
        "url": {
          "type": "string"
        },
        "description": {
          "type": "string"
        }
      }
    }
  }
}
```

According to embodiments, a similar element in XML can be defined for the above descriptor.

Use of the Descriptor in Workflow Description

Repository Descriptor can be added as optional descriptor to Workflow Description (Table 3):

TABLE 3

Workflow Description

| Descriptor | Description | | | Cardinality |
|---|---|---|---|---|
| General | Parameters of the General descriptors are applicable except the following: InputPorts OutputPorts | | | 1 |
| Repository | Location of repositories to be used for this workflow | | | 0-1 |
| Input | Parameters of the Input descriptor are applicable | | | 1 |
| Output | Parameters of the Output descriptor are applicable | | | 1 |
| Processing | Parameters of the Processing descriptor are applicable except the following: URL | | | 0-1 |
| Requirement | Parameters of the Requirement descriptor are applicable with below additional information | | | 1 |
| | Requirements | Details | Cardinality | |
| | Processor requirements | Indicates minimum processing capabilities to any media processing entity that will be provisioned in the workflow | 0-1 | |
| | CPU Cores | Indicates minimum number of CPU cores to be allocated to any media processing entity that will be provisioned in the workflow | 0-1 | |
| | GPU | Indicates minimum number of GPUs to be allocated to any media processing entity that will be provisioned in the workflow | 0-1 | |
| | Aggregated storage | Indicates aggregated storage for all media processing entities allocated for the workflow | 0-1 | |
| Client Assistance | Parameters of the Client Assistance descriptor are applicable | | | 0-1 |
| Failover | Parameters of the Failover descriptor are applicable | | | 0-1 |
| Monitoring | Parameters of the Monitoring descriptor are applicable except the following: Variable | | | 0-1 |

TABLE 3-continued

Workflow Description

| Descriptor | Description | Cardinality |
| --- | --- | --- |
| Assertion | Parameters of the Assertion descriptor are applicable | 0-1 |
| Reporting | Parameters of the Reporting descriptor are applicable | 0-1 |
| Notification | Parameters of the Notification descriptor are applicable | 0-1 |

According to embodiments, the bolded row above indicates the use of a new descriptor in NBMP Workflow Description.

Figure 4:
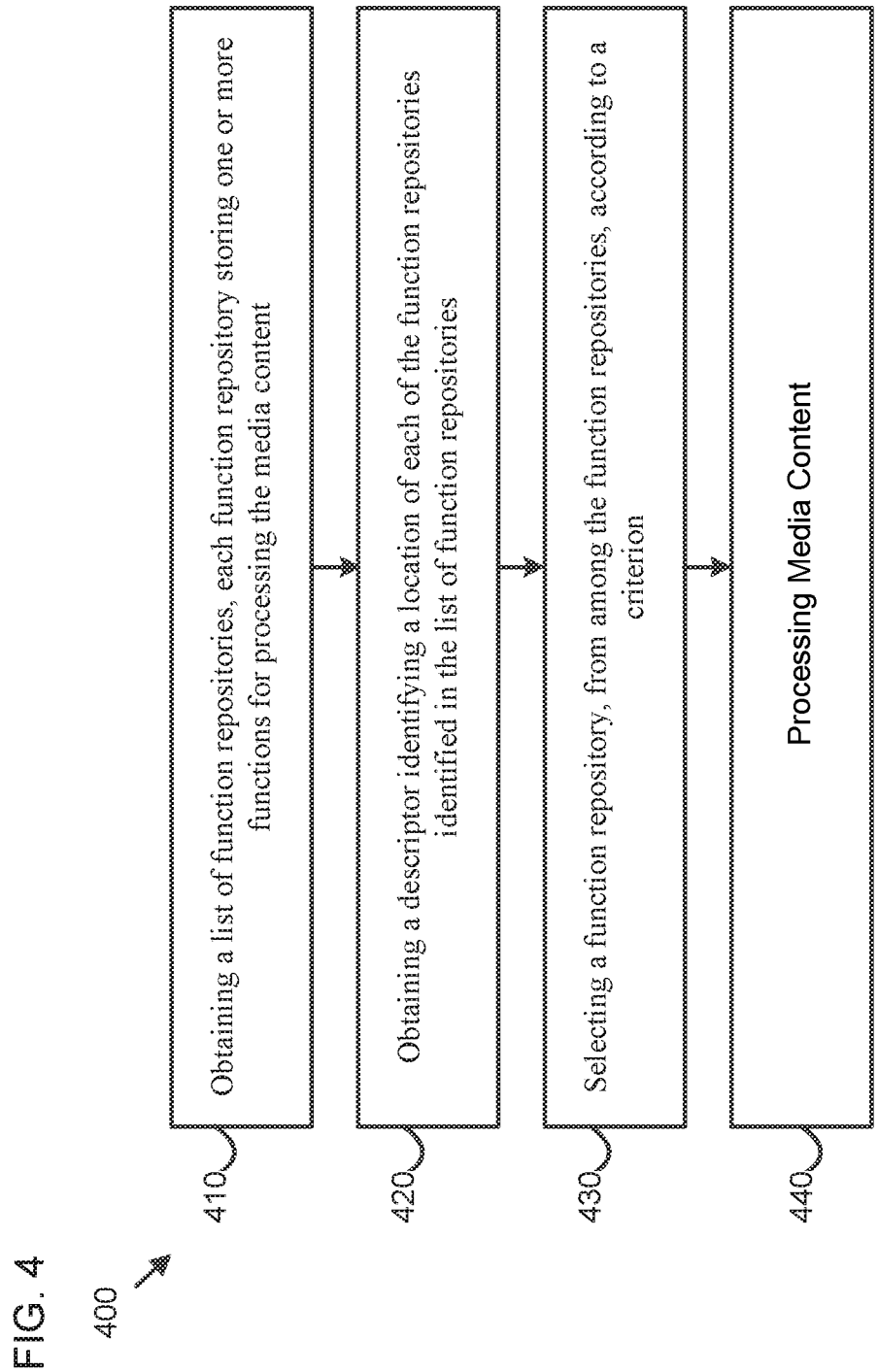
FIG. 4 is a flowchart of a method of processing media content in MPEG NBMP, according to embodiments.

FIG. 4 is a flowchart of a method 400 of processing media content in MPEG NBMP, according to embodiments. In some implementations, one or more process blocks of FIG. 4 may be performed by the platform 120 implementing the NBMP system 300. In some implementations, one or more process blocks of FIG. 4 may be performed by another device or a group of devices separate from or including the platform 120 implementing the NBMP system 300, such as the user device 110.

As shown in FIG. 4, in operation 410, the method 400 includes obtaining a list of function repositories, each function repository storing one or more functions for processing the media content.

In operation 420, the method 400 includes obtaining a descriptor identifying a location of each of the function repositories identified in the list of function repositories.

In operation 430, the method 400 includes selecting a function repository, from among the function repositories, according to a criterion.

In operation 440, the method 400 includes processing the media content using a function included in the selected function repository.

The method may further include that the selecting the function repository includes selecting the function repository according to one from among a mode parameter, an ordered parameter, and a repository parameter.

The method may further include that the selecting the function repository includes selecting the function repository according to the mode parameter, and the mode parameter includes one from among a strict value, a preferred value, and an available value.

The method may further include that the selecting the function repository includes, based on the mode parameter being the strict value, selecting the function repository from among only the function repositories in the list of function repositories.

The method may further include that the selecting the function repository includes, based on the mode parameter being the preferred value, selecting a function repository that is not on the list of function repositories in response to the function for processing the media not being included in the list of function repositories.

The method may further include that the selecting the function repository includes selecting the function repository according to the ordered parameter, wherein the list of function repositories is listed according to a preference order.

The method may further include that the location of each of the function repositories is identified by a uniform resource locator (URL).

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
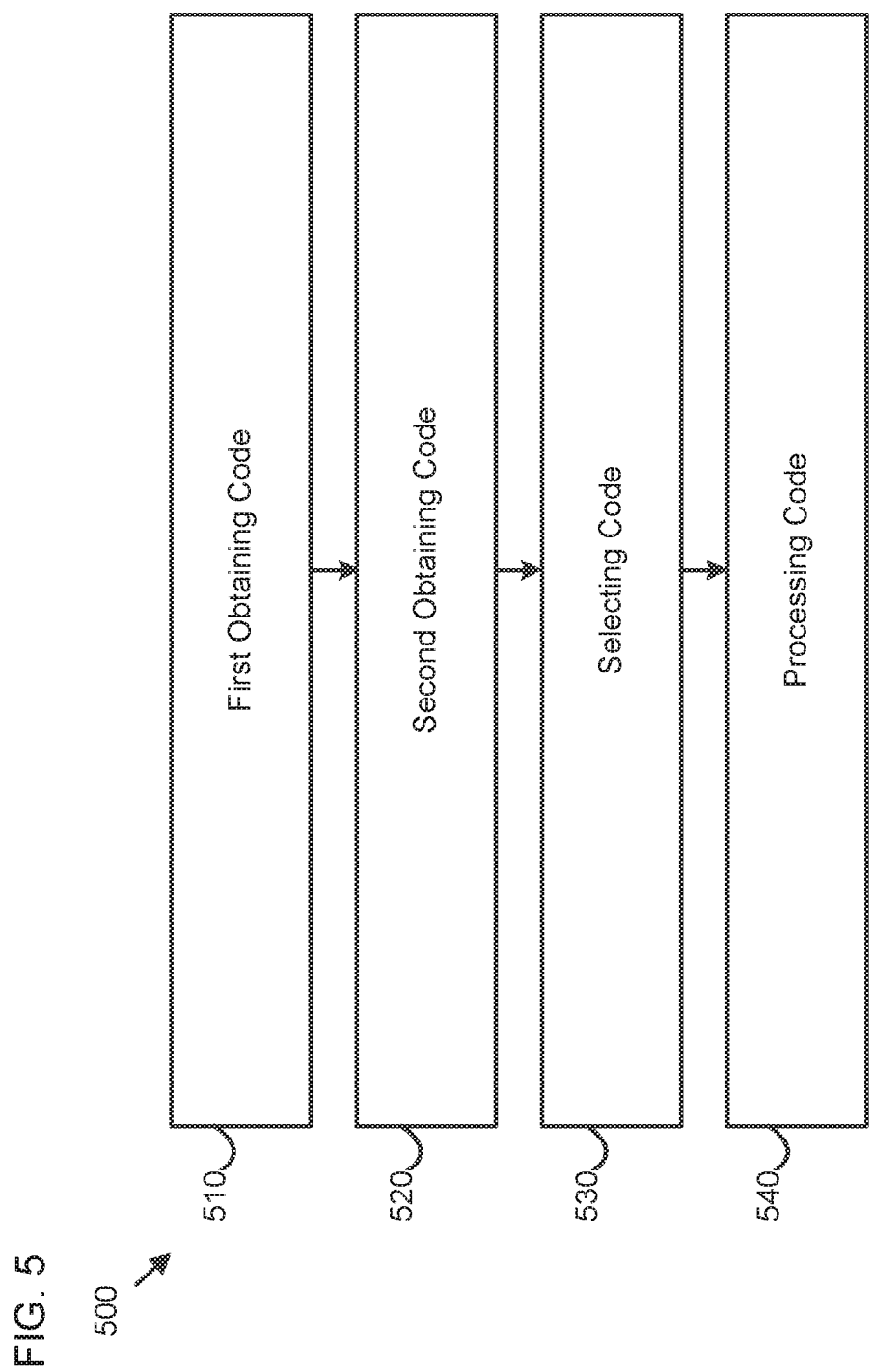
FIG. 5 is a block diagram of an apparatus for processing media content in MPEG NBMP, according to embodiments.

FIG. 5 is a diagram of an apparatus 500 for processing media content in MPEG NBMP, according to embodiments. As shown in FIG. 5, the apparatus 500 includes first obtaining code 510, second obtaining code 520, selecting code 530 and processing code 540.

The first obtaining code 510 is configured to cause the at least one processor to obtain a list of function repositories, each function repository storing one or more functions for processing the media content.

The second obtaining code 520 is configured to cause the at least one processor to obtain a descriptor identifying a location of each of the function repositories identified in the list of function repositories.

The selecting code 530 is configured to cause the at least one processor to select a function repository, from among the function repositories, according to a criterion.

The processing code 540 may be configured to cause the at least one processor to process the media content using a function included in the selected function repository.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
obtaining a list of function repositories, each function repository storing a respective plurality of functions for processing the media content;
obtaining a descriptor identifying a location of each of the function repositories, storing the respective plurality of functions, identified in the list of function repositories;
selecting a function repository, by a NBMP source, from among the function repositories storing the respective plurality of functions, according to a criterion; and
processing the media content using a function included in the selected function repository.

2. The method of claim 1, wherein the selecting the function repository comprises selecting the function repository according to one from among a mode parameter, an ordered parameter, and a repository parameter.

3. The method of claim 2, wherein the selecting the function repository comprises selecting the function repository according to the mode parameter, and the mode parameter comprises one from among a strict value, a preferred value, and an available value.

4. The method of claim 3, wherein the selecting the function repository comprises, based on the mode parameter being the strict value, selecting the function repository from among only the function repositories in the list of function repositories.

5. The method of claim 3, wherein the selecting the function repository comprises, based on the mode parameter being the preferred value, selecting a function repository that is not on the list of function repositories in response to the function for processing the media content not being included in the list of function repositories.

6. The method of claim 2, wherein the selecting the function repository comprises selecting the function repository according to the ordered parameter, wherein the list of function repositories is listed according to a preference order.

7. The method of claim 1, wherein the location of each of the function repositories is identified by a uniform resource locator (URL).

8. An apparatus for processing media content in Moving Picture Experts Group (MPEG) Network Based Media Processing (NBMP), the apparatus comprising:
at least one memory configured to store program code; and
at least one processor configured to read the program code and operate as instructed by the program code, the program code comprising:
first obtaining code configured to cause the at least one processor to obtain a list of function repositories, each function repository storing a respective plurality of functions for processing the media content;
second obtaining code configured to cause the at least one processor to obtain a descriptor identifying a location of each of the function repositories, storing the respective plurality of functions, identified in the list of function repositories;
selecting code configured to cause the at least one processor to select a function repository, by a NBMP source, from among the function repositories storing the respective plurality of functions, according to a criterion; and
processing code configured to cause the at least one processor to process the media content using a function included in the selected function repository.

9. The apparatus of claim 8, wherein the selecting code is further configured to cause the at least one processor to select the function repository according to one from among a mode parameter, an ordered parameter, and a repository parameter.

10. The apparatus of claim 9, wherein the selecting code is further configured to cause the at least one processor to select the function repository according to the mode parameter, and the mode parameter comprises one from among a strict value, a preferred value, and an available value.

11. The apparatus of claim 10, wherein the selecting code is further configured to cause the at least one processor to, based on the mode parameter being the strict value, select the function repository from among only the function repositories in the list of function repositories.

12. The apparatus of claim 10, wherein the selecting code is further configured to cause the at least one processor to, based on the mode parameter being the preferred value, select a function repository that is not on the list of function repositories in response to the function for processing the media content not being included in the list of function repositories.

13. The apparatus of claim 9, wherein the selecting code is further configured to cause the at least one processor to select the function repository according to the ordered parameter, wherein the list of function repositories is listed according to a preference order.

14. The apparatus of claim 8, wherein the location of each of the function repositories is identified by a uniform resource locator (URL).

15. A non-transitory computer-readable medium storing instructions that, when executed by at least one processor of an apparatus for processing media content in Moving Picture Experts Group (MPEG) Network Based Media Processing (NBMP), cause the at least one processor to:
obtain a list of function repositories, each function repository storing a respective plurality of functions for processing the media content;
obtain a descriptor identifying a location of each of the function repositories, storing the respective plurality of functions, identified in the list of function repositories;
select a function repository, by a NBMP source, from among the function repositories storing the respective plurality of functions, according to a criterion; and
process the media content using a function included in the selected function repository.

16. The non-transitory computer-readable medium of claim 15, wherein the instructions further cause the at least one processor to select the function repository according to one from among a mode parameter, an ordered parameter, and a repository parameter.

17. The non-transitory computer-readable medium of claim 16, wherein the instructions further cause the at least one processor to select the function repository according to the mode parameter, and the mode parameter comprises one from among a strict value, a preferred value, and an available value.

18. The non-transitory computer-readable medium of claim 17, wherein the instructions further cause the at least one processor to, based on the mode parameter being the strict value, select the function repository from among only the function repositories in the list of function repositories.

19. The non-transitory computer-readable medium of claim 17, wherein the instructions further cause the at least one processor to, based on the mode parameter being the preferred value, select a function repository that is not on the list of function repositories in response to the function for processing the media content not being included in the list of function repositories.

20. The non-transitory computer-readable medium of claim 16, wherein the instructions further cause the at least one processor to select the function repository according to the ordered parameter, wherein the list of function repositories is listed according to a preference order.

* * * * *